United States Patent [19]

Pelz et al.

[11] Patent Number: 5,217,673
[45] Date of Patent: Jun. 8, 1993

[54] ARRANGEMENT FOR THE REMOVAL OF AN EMBEDDING BODY FROM THE EMBEDDED COMPONENT

[75] Inventors: Horst Pelz, Unterschleissheim; Armin Klier, Neufahrn; Herbert Graf, Kirchdorf, all of Fed. Rep. of Germany

[73] Assignee: MTU Motoren- und Turbinen-Union Munchen GmbH, Fed. Rep. of Germany

[21] Appl. No.: 810,901

[22] Filed: Dec. 20, 1991

Related U.S. Application Data

[62] Division of Ser. No. 590,796, Oct. 1, 1990, Pat. No. 5,112,389.

[30] Foreign Application Priority Data

Sep. 29, 1989 [DE] Fed. Rep. of Germany ....... 3932571

[51] Int. Cl.⁵ ................................................ C22B 9/20
[52] U.S. Cl. ...................................... 266/80; 266/205; 29/239
[58] Field of Search .................... 29/239; 266/205, 80

[56] References Cited

U.S. PATENT DOCUMENTS 4,827,583 5/1989 Mushardt et al. .................... 29/239

Primary Examiner—Melvyn J. Andrews
Attorney, Agent, or Firm—Evenson, McKeown, Edwards, & Lenahan

[57] ABSTRACT

A process and an arrangement are disclosed for the removal of a low-melting embedding body from a higher-melting embedded component. A groove is provided along a molding-in base of the component and by means of the widening of the groove via heatable elements, the resulting halves of the embedding body are removed. The process and the arrangement are particularly suitable for separating embedded guide and moving blades from the manufactured embedding body.

7 Claims, 2 Drawing Sheets

ARRANGEMENT FOR THE REMOVAL OF AN EMBEDDING BODY FROM THE EMBEDDED COMPONENT

This is a division of application Ser. No. 07/590,796, filed Oct. 1, 1990 now U.S. Pat. No. 5,112,389.

BACKGROUND AND SUMMARY OF THE INVENTION

The invention relates to a process and an arrangement for the removal of an embedding body made of a lower-melting material from an embedded higher-melting metal component or ceramic component.

It is known that embedding bodies of this type consisting of low-melting metal alloys or thermoplastics are cast around metal components or ceramic components of complicated shapes in order to embed these partially so that the embedded part can be chucked or fixed in machines while the unembedded part can be machined.

A known process for the removal of these embedding bodies from the embedded component is the melting-off of the embedding body in hot oil. This process has the disadvantages of the oil removal, of the necessary suction-removal of the oil vapors, of the long melting-off period, of the washing-off of the oil residues from the component, of the removal of oil residues, for example, from capillary bores in the component, of the removal of the washing-off medium and of the vapors of the washing-off medium, and the related environmental stress.

Another process consists of splitting the embedding body in a press by means of two separating bars. This process has the disadvantage that high uncontrollable pressures are exercised on the embedded component so that there is a high risk of rejections, and compact residues of the embedding material must be removed subsequently at certain points which again requires oil baths.

It is an object of the invention to provide a process and an arrangement of this type which ensures a low-residue removal of the embedding body which does not stress or deform the embedded component while the risk of rejections is reduced at the same time and the means used in the process are less stressful to the environment.

This object is achieved by a process in which the following steps are carried out:
a. placing a groove in the embedding body along the molding-in base of the embedded component; and
b. removing of the halves of the embedding body from the embedded component by widening the groove along the molding-in base.

This process overcomes the disadvantages of the previous process and saves considerable waste removal costs since no oil is used. In addition, the costs with respect to rejections are reduced since the embedding body is removed from the embedded component under the effect of minimal force after the providing of a groove, for example, by milling, sawing or grinding.

By mean of a preferable melting-out of the groove, even advancing and cutting forces as well as abrasion marks of a possible cutting-in of the groove are advantageously avoided.

The melting-out has the additional advantage that arbitrary and also bent or curved groove cross-sections can be made in one operation because only the shape of the melting-out tool must be adapted to the cross-section of the groove.

A preferred embodiment of the process provides a melting-out at temperatures of between 50° and 350° C., preferably between 130° and 180° C. The large temperature range has the advantage that also thermoplastics may be used as the embedding material. In a narrower range, low-melting metals can be used as the embedding material, such as the metal alloy tin/bismuth with 30 to 70 percent in weight of bismuth.

The difference between the melting temperature of the embedding material and the melting temperature of the embedded component should be at least 150° C. so that a possible local overheating of the component is avoided.

The embedding and removal is preferably used for components made of a nickel, cobalt or titanium base alloy from which guide blades or moving blades of axial-flow turbines and axial-flow compressors are made. In this case, the blade base and the blade tip can be machined while the finished blade with its capillary bores is chucked in in the embedded area.

The removal of he halves of the embedding body created by the provided groove from the embedded component may preferably take place by a pulling-apart, turning-apart, pushing-apart, pressing-apart or blowing-apart. This has the advantage that the halves of the embedding body are removed from the component without any large formation of residues The finishing of the component is therefore minimized.

As far as the arrangement for carrying out the process is concerned, the object is achieved in that the arrangement has at least one heatable element which, in its dimensions, corresponds to the cross-section of the groove to be provided, and is arranged so that it can be moved in at least one direction in space and be rotated around at least one direction in space, and has a receiving device for the embedding body.

This arrangement has the advantage that it does not apply the groove in a cutting but in a thermal manner and thus has an extremely gentle effect on the embedded component so that damage to the component is largely avoided. In addition, it does not require any fast-rotating tools so that it has a long service life and can be produced at low manufacturing costs.

As the melting-out tool, the arrangement has a heatable element which advantageously can be adapted to any desirable groove cross-section.

A preferred development of the heatable element provides that it is elastically mounted so that, during the melting-out, the tip of the heatable element can follow the contour of the embedded component without the requirement of any adjustment. This self-adjustment permits a complete dividing of the embedded body in two halves along the molding-in base so that these halves fall apart without an expenditure of force, for example, by being blown by a jet of compressed air.

If the component is embedded such that it projects out of the embedding body on two opposite sides, the arrangement preferably has two heatable elements in the form of two hot rods which simultaneously melt out a groove on the front edge and the rear edge of the component so that the melting-out operation is shortened and the productivity of the arrangement is increased.

Another preferred development of the arrangement has a blade-shaped heatable element the blade of which completely fills in the required groove along the front edge or rear edge of a correspondingly shaped embedded component in the embedding body with the exception of a melting gap. This melting gap is created automatically by the flowing-off of the melted-off embedding body material along the wall of the groove. This preferred development of the invention has the advantage that the melting-out operation is shortened further.

A further reduction of the melting-out time is achieved by means of an arrangement which preferably has two blade-shaped heatable elements which simultaneously fill in the whole groove on the front and rear edge of an embedded component, the arrangement making it possible that the groove is not melted out all the way to the component. Although this requires a higher expenditure of force during the removal of the embedding-body halves, it has the advantage that during the melting-out of the groove no melted material can penetrate into capillary bores or slots of the component.

In a preferred development, the heatable elements are arranged such that a groove is created which is vertical or which extends up to a slope of 60° with respect to the vertical line. An arrangement of this type ensures the discharge of the molted-open embedding material into a drip pan without any additional auxiliary measures, such as the turning of the embedding body for the throwing-out or flowing-off of the melted mass.

The arrangement is preferably controlled digitally so that it can be used advantageously in mass production.

Other objects, advantages and novel features of the present invention will become apparent from the following detailed description of the invention when considered in conjunction with the accompanying drawings.

DETAILED DESCRIPTION OF THE DRAWINGS

Figure 1:
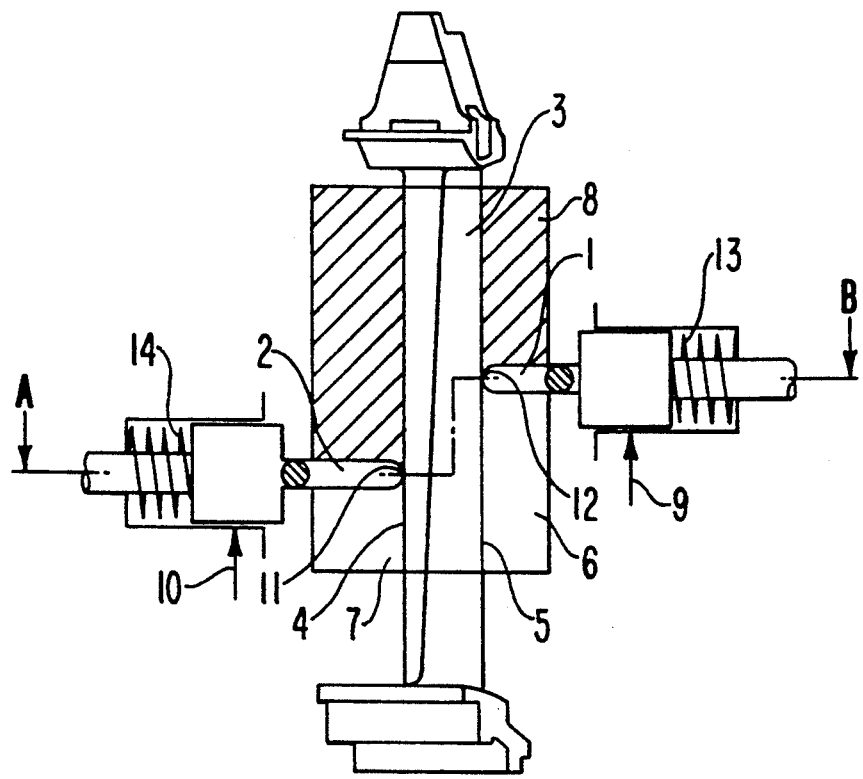
FIG. 1 represents the principle of an arrangement for carrying out the process of the invention by means of heating rods.

FIG. 1 represents the principle of an arrangement for carrying out the process by means of heating rods 1 and 2 which simultaneously expose the front edge 4 and the rear edge 5 on a moving blade 3 made of a nickel base alloy with a melting point of 1,330° C. In the process, two grooves 6 and 7 are melted out of a cuboid-shaped embedding body 8 made of a tin/bismuth alloy having a melting point of 137° C. During the vertical upward movement in the directions of arrows 9 and 10, the heating rods 1 and 2, by means of their semicircular points 11 and 12, are pressed against the front edge 4 and the rear edge 5 of the moving blade 3 by means of the spring bearings 13 and 14. After the complete melting-out of the two grooves 6 and 7, the embedding body 8 breaks apart into two halves which are removed from the moving blade 3.

Figure 2:
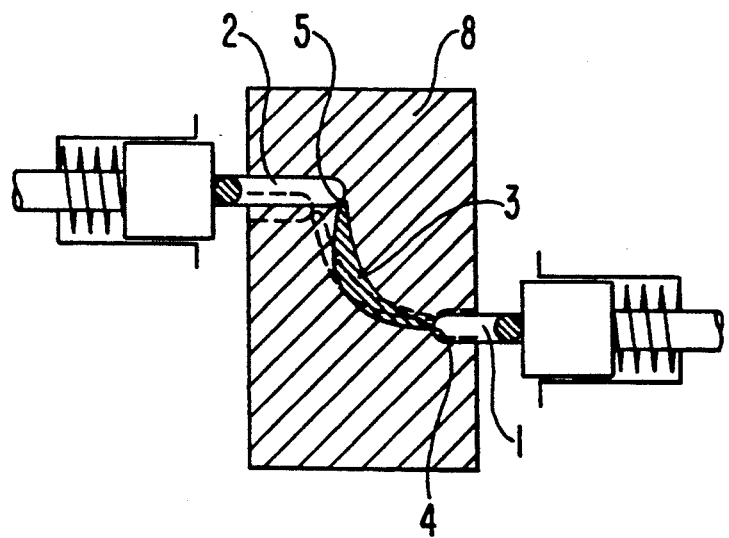
FIG. 2 is a sectional view A—B of the arrangement according to FIG. 1.

FIG. 2 illustrates a section A-B of the arrangement according to FIG. 1, the guide blade 3 being visible in its profile and being touched by the two heating rods 1 and 2 at its front edge 4 and rear edge 5, while grooves are melted out of the embedding body 8 in the area of the heating rods 1 and 2.

Figure 3:
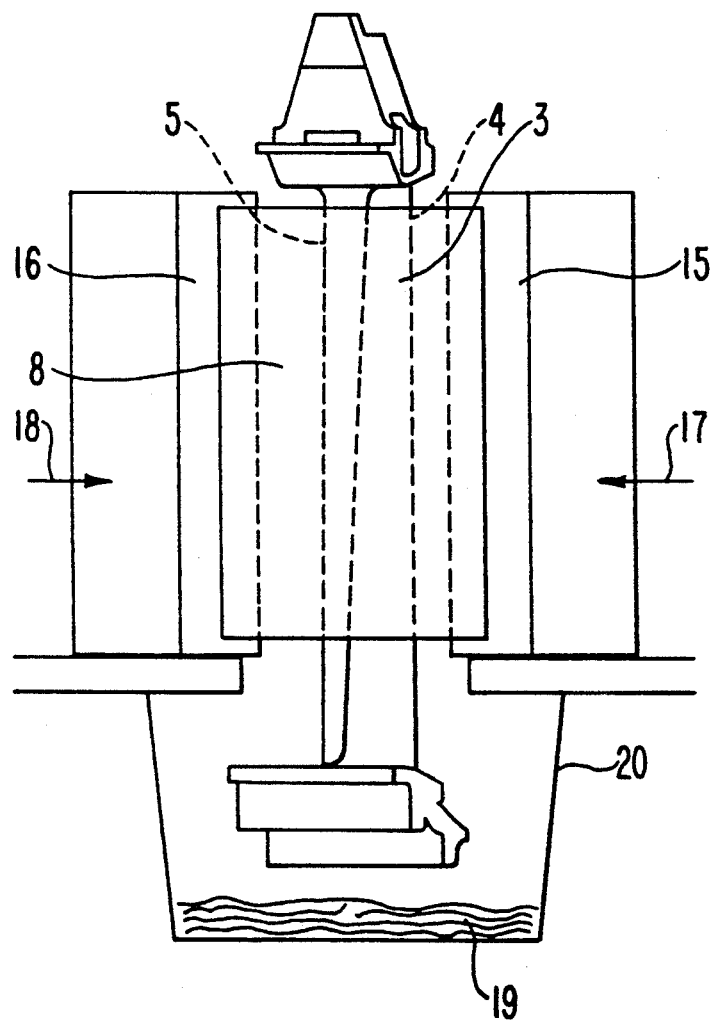
FIG. 3 represents the principle of an arrangement for carrying out the process by means of heated blades.

FIG. 3 illustrates the principle of an arrangement for carrying out the process by means of heated blades 15 and 16 which are melted into the embedding body 8 in the direction of the arrows 17 and 18. In the process, the melted-off embedding material 19 flows into the drip pan 20 and may be reused. The heated blades 15 and 16 may be stopped shortly before they reach the front edge 4 and the rear edge 5 if a minimal residual web of embedding material is to protect the front edge 4 and the rear edge 5 of the moving blade 3 from damage or from the penetration of melted mass into capillary bores and slots. After the melting-out of the grooves at the front edge 4 and the rear edge 5, the halves of the embedding body 8 may be removed from the moving blade 3 by a mechanical widening of the grooves.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An arrangement for carrying out a process for removal of a low-melting metal body from an embedded higher-melting component having a molded-in base comprising a leading edge and a trailing edge spaced from the leading edge, wherein
   a) the melting-out of the low-melting metal body includes forming a groove along the spaced leading and trailing edges of the embedded component, and
   b) the removal of portions of the low-melting metal body from the embedded component includes widening the groove along both the leading and trailing edges of the molding-in bases,
   said arrangement comprising heatable elements sized and configured to correspond to the cross-section of the groove to be formed in the low-melting metal body at the spaced leading and trailing edges and arranged so as to be translatable in at least one direction relative to the embedding material and spaced from each other in a direction transverse to the one direction in which said heating elements are translatable so as to from the grooves along the leading and trailing edges and
   a receiving device arranged relative to the embedding body for receiving the portions of the low-melting metal body removed by the at least one heatable element.

2. An arrangement according to claim 1, wherein the heatable element includes a heating rod which is elastically mounted and a tip of which is guided by the contour of the embedded component.

3. An arrangement according to claim 1, wherein the heatable elements are two heating rods which simultaneously melt open the groove at the leading edge and the trailing edge of the embedded component.

4. An arrangement according to claim 1, wherein each heatable element has a shape which, during the melting-out, on one side, completely fills in one side of the groove except for a melting gap.

5. An arrangement according to claim 1, wherein the heatable elements are configured and arranged to fill in the whole groove which is required for removing the low-melting metal body, simultaneously on both sides of the low-melting metal body.

6. An arrangement according to claim 1, wherein the groove is arranged during the melting-out one of vertically and up to a slop of 60° with respect to a vertical line.

7. An arrangement according to claim 1, wherein the heating elements are controlled digitally.

* * * * *